This invention relates to plate clutches and more particularly to an improved clutch release mechanism for motor vehicle type clutches.

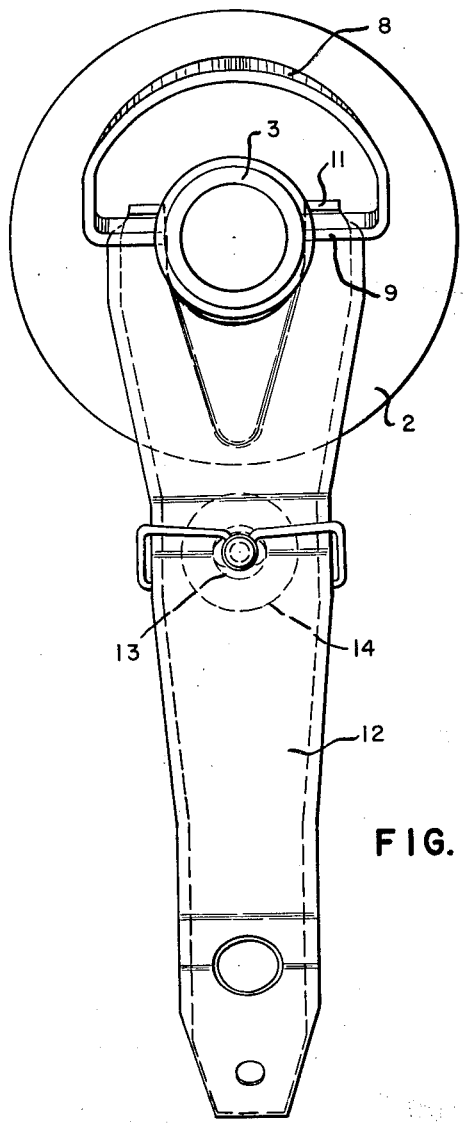
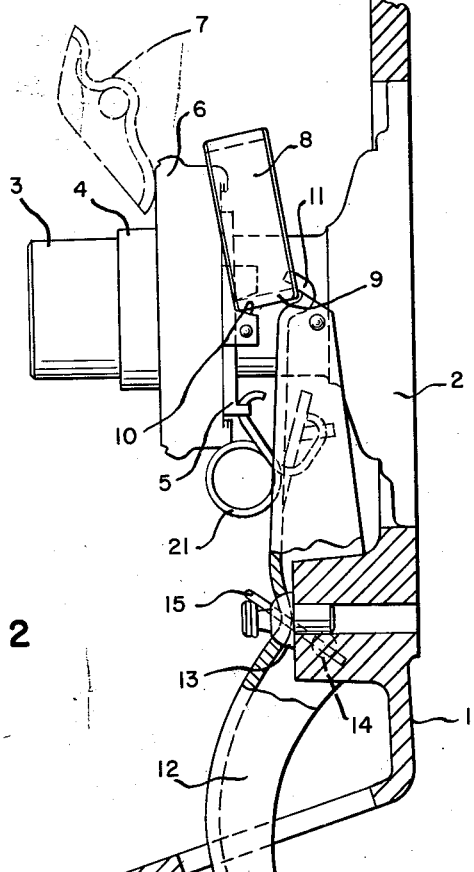
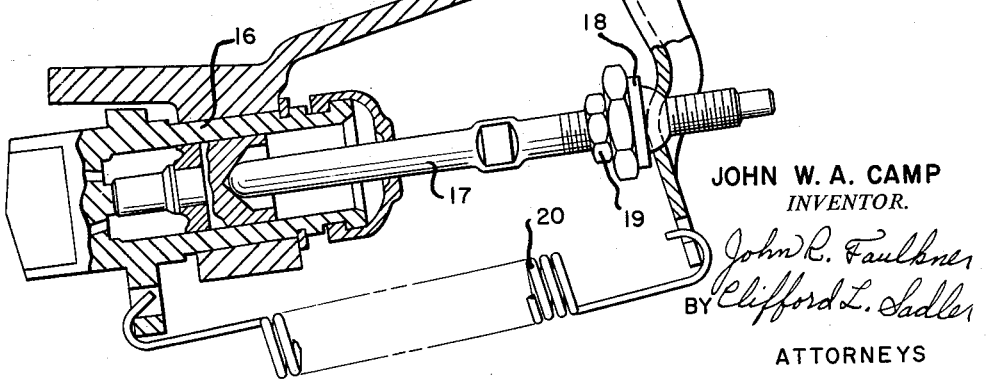
FIG. 3
FIG. 2
FIG. 1
JOHN W. A. CAMP
*INVENTOR.*
ATTORNEYS 3,099,340
CLUTCH RELEASE MECHANISM
John W. A. Camp, Colchester, England, assignor to Ford Motor Company, Dearborn, Mich., a corporation of Delaware
Filed Jan. 28, 1960, Ser. No. 5,182
Claims priority, application Great Britain June 5, 1959
2 Claims. (Cl. 192—99)

In conventional clutch release mechanisms for dry plate clutches, it is common to employ a release lever pivoting approximately at its center on a spherical headed stud, which imparts an axial movement to a clutch release bearing at its one extremity when actuated by a spherical headed push rod at its other. In constructions of this type it has been found that the force to overcome the sliding friction between these parts when the clutch is released is a significant part of the clutch pedal load.

Therefore, it is an object of the present invention to provide a clutch release mechanism wherein friction reducing means is located between the clutch release lever and the clutch release bearing, and further, to replace the sliding movement at the central pivot and load input end of the release lever by antifriction rolling action.

More specifically, the preferred friction reducing means is formed by a semi-circular strip having inwardly bent ends which serves as a strut or link strip to eliminate sliding friction between the clutch release lever and the flange of the release bearing hub. As a result the load at the clutch pedal required to actuate the clutch mechanism is thereby reduced.

One particular form of this improved release mechanism, which is at present the preferred embodiment of the invention will now be described with reference to the accompanying drawings, wherein:

FIGURE 1 shows a longitudinal section through the clutch release mechanism.

FIGURE 2 shows a front elevation of the clutch release lever and link strip mechanism.

FIGURE 3 shows an inverted plan view of the link strip.

Referring now to the drawings, in FIGURE 1 a clutch housing 1 which carries a clutch release bearing hub guide 2 is shown. A short stationary shaft 3 extends inwardly from and integral with the guide 2 and slidably supports a release bearing hub consisting of a sleeve portion 4 and a flange plate 5. A release bearing 6 is mounted on the hub and by means of a to-and-fro motion actuates a plurality of circumferentially arranged clutch release fingers 7 (only one of which is shown in the drawings) in a well known manner.

Engaging the flange plate 5 of the release bearing hub is a strut or link strip 8 axially located about the bearing hub guide 2. As can be seen in FIGURES 2 and 3, this link strip 8, which is formed by a simple pressing operation from mill edge stock, is semi-circular with its ends 9 bent inwardly. The said ends 9 have a slight curve at their edges and are so designed to be accommodated in bearing grooves 10. Grooves 10 are of V-shape and are pressed in the flange plate 5. The other edge of the ends 9 are accommodated in shaped grooves 11 which are provided in the bifurcated end at the top of the clutch release lever 12.

The clutch release lever 12 is generally of channel shape having a hole approximately at mid length which locates about a stud 13 that is press-fitted into a spotfaced boss 14 on the clutch housing 1. During operation of the clutch release mechanism there is a running clearance between the spherical surface of the stud 13 and the clutch release lever 12. The pivoting surface of the said lever 12 rolls on the spotfaced boss 14 which carries the load. A wire clip 15 is shaped to encircle a projection on the stud 13, and has its ends bent to locate drilled holes in the side walls of the channel-shaped clutch release lever 12. When the clutch is actuated, wire clip 15 retains the said lever 12 to the stud 13.

The clutch is actuated by thrust applied from a slave cylinder 16 to the clutch release 12 by means of a push rod 17 having an adjustable anvil 18 threaded thereon. Anvil 18 may be locked at the required setting by means of a lock nut 19. There is a running clearance provided between the spherical surface of anvil 18 and clutch release lever 12 which is formed to roll on the flat surface of said anvil. Cylinder 16 is activated by a pressure source not shown, such as a pedal actuated master cylinder.

To assure contact between the clutch release lever 12 and the anvil 18, when the clutch is engaged, and also to assure that the release bearing 6 is clear from the clutch fingers 7, when not in use, a tension spring 20 is provided. Tension spring 20 has one of its ends linked to the slave cylinder 16 and its other end linked to the lower end of the clutch release lever 12.

A spring clip 21 holds the link strip 8 in place between the flange plate 5 and the clutch release lever 12.

In operation, the plates (not shown) of the clutch are normally spring pressed into engagement. When declutching is desired, pressure fluid is directed to slave cylinder 16 from a remote control source. As a consequence, push rod 17 is forced to the right and lever 12 is pivoted in a counterclockwise direction about stud 13. The upper end 11 of lever 12 bears against the link strip 8 which in turn exerts a force on the flange plate 5 of the release bearing hub. This moves the bearing 6 to the left and disengages the clutch plates by means of fingers 7. Relative movement between the end 11 and link strip 8 and between strip 8 and grooves 10 is of a pivoting or rocking type. Such movement exhibits very low friction as compared with the sliding friction common to the conventional sliding engagement of the clutch release lever with the release bearing.

A clutch release mechanism according to the present invention has the advantage that friction between the clutch release lever and the flange of the release bearing hub is minimized by the introduction of the link strip, which by the nature of its design is self-located and performs the further function of linking the clutch release lever to the hub flange, thus substantially eliminating the friction associated with the known sliding lever, and at the same time preventing rotation of the release bearing hub.

A further advantage is that thrust is applied centrally to the release bearing hub at all times, the directional variations of the thrust being small.

A still further advantage of the present invention is that the machining of the release bearing hub is substantially reduced and the riveting of the spring clip is eliminated, resulting in a saving in cost.

Another advantage is that friction at the fulcrum point of the clutch release lever and at its lower end, where it is engaged by the push-rod, is almost completely eliminated.

The foregoing description constitutes the preferred embodiment of the present invention. Modifications and alternate arrangements may occur to those skilled in the art which will come within the scope and spirit of the following claims.

I claim:
1. A clutch release mechanism having a pivotally mounted release lever and an axially movable clutch release bearing, said bearing having axially spaced clutch engaging and clutch disengaging positions, a C-shaped sheet metal member operatively interposed between the end of said lever and said bearing, said member having a semi-circular configuration with end portions that are bent inwardly toward the axis of said bearing, one edge of said bent ends engaging said bearing and the opposite edge of said bent ends engaging said lever, said lever being rotatable through an arc to move said bearing from one of said positions to the other of said positions, said member being adapted to transfer force from the arcuate motion of said lever to axial motion of said bearing.

2. A clutch release mechanism having a pivotally mounted clutch release lever and an axially movable clutch release bearing, a shaft slideably receiving said bearing, said bearing having axially spaced apart clutch engaging and clutch disengaging positions, said lever having a bifurcated end straddling said shaft, a sheet metal member operatively interposed between said lever and said bearing, said sheet metal member having a semi-circular configuration and straddling said shaft, said sheet metal member having end positions bent inwardly, one edge of said positions engaging said bearing and the other side engaging said lever, said lever being rotatable through an arc to move said bearing from one of said positions to the other of said positions, said member being adapted to transfer force from the arcuate motion of said lever to axial motion of said bearing.

References Cited in the file of this patent

UNITED STATES PATENTS

| | | |
|---|---|---|
| 1,655,169 | Taub | Jan. 3, 1928 |
| 1,683,624 | Murphy | Sept. 11, 1928 |
| 2,096,151 | Watt | Oct. 19, 1937 |
| 2,250,394 | Reed | July 22, 1941 |
| 2,366,643 | Nutt | Jan. 2, 1945 |
| 2,840,208 | Zeidler et al. | June 24, 1958 |

FOREIGN PATENTS

| | | |
|---|---|---|
| 382,088 | Great Britain | Oct. 20, 1932 |